US00RE46950E

(19) United States
(12) Reissued Patent
Ishibashi et al.

(10) Patent Number: US RE46,950 E
(45) Date of Reissued Patent: Jul. 10, 2018

(54) ELECTRIC WIRE OR CABLE

(71) Applicant: YAZAKI CORPORATION, Tokyo (JP)

(72) Inventors: Kenichi Ishibashi, Susono (JP); Kazumi Mochizuki, Susono (JP); Yasunobu Kondo, Numazu (JP)

(73) Assignee: Yazaki Corporation, Tokyo (JP)

(21) Appl. No.: 14/717,601

(22) Filed: May 20, 2015

Related U.S. Patent Documents

Reissue of:
(64) Patent No.: 8,850,863
Issued: Oct. 7, 2014
Appl. No.: 13/382,506
PCT Filed: Jul. 6, 2010
PCT No.: PCT/JP2010/061464
§ 371 (c)(1),
(2) Date: Jan. 5, 2012
PCT Pub. No.: WO2011/004814
PCT Pub. Date: Jan. 13, 2011

(30) Foreign Application Priority Data

Jul. 6, 2009 (JP) ..... 2009-159549

(51) Int. Cl.

| | |
|---|---|
| ***H01B 7/00*** | (2006.01) |
| ***B21C 9/00*** | (2006.01) |
| ***H01B 1/02*** | (2006.01) |
| ***C22C 21/02*** | (2006.01) |
| ***C22C 21/06*** | (2006.01) |
| ***C22C 21/08*** | (2006.01) |
| ***C22C 21/14*** | (2006.01) |
| ***C22C 21/16*** | (2006.01) |
| ***C22F 1/04*** | (2006.01) |
| ***C22C 21/00*** | (2006.01) |
| ***C22C 21/12*** | (2006.01) |

(52) U.S. Cl.
CPC ..... *H01B 1/023* (2013.01); *C22C 21/00* (2013.01); *C22C 21/02* (2013.01); *C22C 21/06* (2013.01); *C22C 21/08* (2013.01); *C22C 21/12* (2013.01); *C22C 21/14* (2013.01); *C22C 21/16* (2013.01); *C22F 1/04* (2013.01)

(58) Field of Classification Search
CPC ..... H01B 1/023; C22C 21/00; C22C 21/02; C22C 21/06; C22C 21/08; C22C 21/12; C22C 21/14; C22C 21/16; C22F 1/04
See application file for complete search history.

(56) References Cited

U.S. PATENT DOCUMENTS

| | | | | |
|---|---|---|---|---|
| 3,513,250 | A | 5/1970 | Schoerner | |
| 3,647,939 | A | 3/1972 | Schoerner | |
| 3,697,260 | A | 10/1972 | Hunsicker | |
| 3,763,686 | A * | 10/1973 | Besel | C22C 21/00 148/689 |
| 3,842,185 | A | 10/1974 | Raw et al. | |
| 3,952,571 | A * | 4/1976 | Yokota et al. | 72/286 |
| 3,959,027 | A | 5/1976 | Matsuda et al. | |
| 3,984,619 | A | 10/1976 | Raw et al. | |
| 4,017,337 | A * | 4/1977 | Winter et al. | 72/256 |
| 4,121,951 | A * | 10/1978 | Fortin | H01B 1/023 148/415 |
| 4,148,204 | A * | 4/1979 | Dotzer et al. | 72/39 |
| 7,550,675 | B2 | 6/2009 | Susai et al. | |
| 2008/0196923 | A1 | 8/2008 | Susai et al. | |
| 2010/0071933 | A1 | 3/2010 | Otsuka et al. | |

FOREIGN PATENT DOCUMENTS

| | | |
|---|---|---|
| CA | 1037742 | 9/1978 |
| CN | 1941222 A | 4/2007 |
| CN | 101128887 A | 2/2008 |
| DE | 2435456 | 2/1975 |
| DE | 155435 | 6/1982 |
| JP | 48-23609 | 3/1973 |
| JP | 49-6451 | 2/1974 |
| JP | 49-78616 | 7/1974 |
| JP | 51-50212 | 5/1976 |
| JP | 54-6966 | 4/1979 |
| JP | 55-145143 | 11/1980 |
| JP | 56-39225 | 8/1983 |
| JP | 58-39225 | 8/1983 |
| JP | 58-217666 | 12/1983 |
| JP | 61-23852 | 6/1986 |
| JP | 62-3228 | 1/1987 |
| JP | 3-253546 | 11/1991 |

(Continued)

OTHER PUBLICATIONS

Machine translation of JP 8-277447, espacenet.com Patent Translate, Jun. 16, 2016.*

International Search Report from Japanese Patent Office fot PCT/JP2010/061464, dated Oct. 12, 2010.

Chinese Office Action corresponding to Chinese Patent Application No. 201080030588.5 dated Mar. 21, 2013.

Rejection Decision issued in Chinese Patent Application No. 201080030588.5, dated Sep. 22, 2014.

Office Action issued by the German Patent and Trademark Office in counterpart Application No. 112010002836.2 dated Apr. 1. 2015, and English translation thereof.

(Continued)

*Primary Examiner* — Sean E Vincent
(74) *Attorney, Agent, or Firm* — Finnegan, Henderson, Farabow, Garrett & Dunner, L.L.P.

(57) ABSTRACT

There is provided an aluminum-alloy material having sufficient electric conductivity and tensile strength as a wiring material and excellent in wire-drawing property, and an electric wire or cable using the same. An electric wire or cable includes an aluminum-alloy strand formed of an aluminum-alloy including Fe: 0.1% by mass or more to less than 1.0% by mass, Zr: 0 to 0.08% by mass, Si: 0.02 to 2.8% by mass, at least one of Cu: 0.05 to 0.63% by mass and Mg: 0.04 to 0.45% by mass, and the remainder being aluminum and unavoidable impurities.

11 Claims, No Drawings

(56) References Cited

FOREIGN PATENT DOCUMENTS

| | | |
|---|---|---|
| JP | 8-277447 | 10/1996 |
| JP | A-2001-254160 | 9/2001 |
| JP | 2003-13162 | 1/2003 |
| JP | A-2004-063290 | 2/2004 |
| JP | 2004-134212 | 4/2004 |
| JP | A-2005-336549 | 12/2005 |
| JP | 2006-19163 | 1/2006 |
| JP | 2006-19164 | 1/2006 |
| JP | 2006-176832 | 7/2006 |
| JP | 2008-38207 | 2/2008 |
| JP | A-2008-112620 | 5/2008 |

OTHER PUBLICATIONS

Notification of Reexamination in Chinese Patent Application No. 201080030588.5, dated Aug. 3, 2015, 3 pgs.

Office Action issued by Indian Patent Office in corresponding Indian patent application No. 211/CHENP/2012, dated Dec. 12, 2016 (8 pages).

Third Office Action mailed Mar. 5, 2014, in corresponding Chinese Patent Application No. 201080030588.5 (4 pages).

* cited by examiner

ELECTRIC WIRE OR CABLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This is a reissue of U.S. Pat. No. 8,850,863, issued on Oct. 7, 2014 from U.S. patent application Ser. No. 13/382,506, which is a national phase application and claims priority to PCT/JP2010/061464, filed Jul. 6, 2010. The entire contents of all of the above-referenced applications are expressly incorporated herein by reference.*

TECHNICAL FIELD

The present invention relates to an aluminum-alloy for conductive wire, an aluminum-alloy strand using the same, and an electric wire or cable using the strand.

BACKGROUND ART

Copper has been mainly used as a conductor material of an electric wire (i.e., a conductive wire) for used in wire harness for automobiles but, from the request for weight saving of the conductor, aluminum has also attracted attention. Although copper is excellent in tensile strength and electric conductivity as the material but has a problem of large weight (i.e., large density). On the other hand, aluminum is light in weight but a problem of insufficient strength remains.

As aluminum-alloy materials for conductive wire, there have been disclosed an aluminum-alloy wiring material wherein iron (Fe), zirconium (Zr), and other element(s) are blended into a parent metal formed of highly pure aluminum having a purity of 99.95% or more in Patent Literature 1; an aluminum-alloy wiring material wherein copper (Cu) and/or magnesium (Mg) and Zr and/or silicon (Si) are contained in a parent metal formed of highly pure aluminum having a purity of 99.95% or more in Patent Literature 2; aluminum-alloy wiring materials each containing Fe, Mg, and Si in prescribed amounts in Patent Literatures 3 and 4; and an aluminum-alloy wiring material containing a prescribed amount of titanium (Ti) or the like in Patent Literature 5.

CITATION LIST

Patent Literature

Patent Literature 1: JP-A-2008-38207
Patent Literature 2: JP-A-2006-176832
Patent Literature 3: JP-A-2006-19163
Patent Literature 4: JP-A-2004-134212
Patent Literature 5: JP-A-2003-13162

SUMMARY OF THE INVENTION

Technical Problem

A strand to be a conductor is usually produced by casting and rolling an alloy material to form a wire rod and then repeating a thermal treatment (i.e., annealing) and wire-drawing the wire rod.

For example, in the case of the aluminum-alloys described in the above Patent Literatures 1 to 4, it becomes possible to thinning a wire until becoming a desired thickness with preventing the wire from breaking by performing the thermal treatment between wire-drawing and wire-drawing process. However, it is not preferable in view of both of time and cost to perform a plurality of thermal treatment steps in batch-wise or another way.

On the other hand, in the above Patent Literature 5, continuous wire-drawing is performed after the thermal treatment before wire-drawing. However, when the thermal treatment is performed before wire-drawing, the wire is prone to be hard owing to hardening by the subsequent wire-drawing and thus there is a problem of lowered electric conductivity and elongation property. Furthermore, there is a concern that the electric conductivity of the electric wire remarkably lowers by the incorporation of a prescribed amount of Ti.

Accordingly, an object of the present invention is to provide an aluminum-alloy material having sufficient electric conductivity and tensile strength as a wiring material and excellent in wire-drawing property, and an electric wire or cable using the same.

Solution to Problem

A first aspect of the invention provides an electric wire or cable which includes an aluminum-alloy strand formed of an aluminum-alloy including:

Fe: 0.1% by mass or more to less than 1.0% by mass;

Zr: 0 to 0.08% by mass;

Si: 0.02 to 2.8% by mass;

at least one of Cu: 0.05 to 0.63% by mass and Mg: 0.04 to 0.45% by mass; and the remainder being aluminum and unavoidable impurities.

A second aspect of the invention provides an aluminum-alloy for conductive wire, including:

Fe: 0.1% by mass or more to less than 1.0% by mass;

Zr: 0 to 0.08% by mass;

Si: 0.02 to 2.8% by mass;

at least one of Cu: 0.05 to 0.63% by mass and Mg: 0.04 to 0.45% by mass; and the remainder being aluminum and unavoidable impurities.

A third aspect of the invention provides a method for producing an aluminum-alloy strand, the method including the steps of:

(1) forming a wire rod using the aluminum-alloy for conductive wire;

(2) wire-drawing the wire rod until becoming a desired final wire diameter; and (3) continuously annealing or batch-wise annealing the wire rod which has been wire-drawn.

Advantageous Effects of the Invention

The aluminum-alloy for conductive wire according to the present invention has a composition capable of providing electric conductivity and tensile strength necessary as a conductor for an electric wire or cable and also a composition excellent in wire-drawing property and capable of wire-drawing a wire rod until becoming a final wire diameter of a strand without annealing (thermal treatment) in midstream. Therefore, by using the aluminum-alloy, it becomes possible to produce an aluminum-alloy strand through continuous annealing or batch-wise annealing after wire-drawing with omitting the thermal treatment to be performed before the wire-drawing and in midstream of the wire-drawing. Thus, cost reduction and productivity improvement can be realized.

The electric wire or cable according to the invention includes an aluminum-alloy strand excellent in electric conductivity, tensile strength, and elongation property, while the strand is light in weight.

MODE FOR CARRYING OUT THE INVENTION

An aluminum-alloy for use in the invention contains prescribed elements added to an aluminum base metal to be a parent metal.

As the aluminum base metal, it is preferred to use pure aluminum having a purity of 99.7% by mass or more. Namely, among pure aluminum base metals defined in JIS H 2102, those having a purity of a first-class aluminum base metal or higher can be preferably used. Specifically, a first-class aluminum base metal having a purity of 99.7% by mass or more, a special second-class aluminum base metal having a purity of 99.85% by mass or more, a special first-class aluminum base metal having a purity of 99.90% by mass or more may be mentioned. Thus, in the invention, it is one characteristic feature that not only expensive high purity ones such as special first-class and special second-class ones but also an aluminum base metal having a purity of 99.7% by mass that is a reasonable price can be used.

The elements to be added into the parent metal (i.e., aluminum basic material) formed of the pure aluminum are iron (Fe), zirconium (Zr), silicon (Si), and copper (Cu) and/or magnesium (Mg).

Fe is an element which has a low solid solubility limit and can increase strength without lowering electric conductivity with precipitation strengthening as a main strengthening mechanism. In order to preferably obtain the effect, Fe is contained in the aluminum-alloy in an amount of 0.1% by mass or more to less than 1.0% by mass, preferably 0.4 to 0.9% by mass. In this regard, in the case of the statement of "a to b % by mass" in the description, it means a % by mass or more to b % by mass or less.

Zr is an element effective for improvement of thermal resistance and is an element which can improve strength through precipitation strengthening. In order to preferably obtain the effect, Zr is contained in the aluminum-alloy in an amount of 0 to 0.08% by mass, preferably 0 to 0.05% by mass. Moreover, practically, the amount may be 0.02 to 0.08% by mass.

Si is an element effective for improvement of strength. In order to preferably obtain the effect, Si is contained in the aluminum-alloy in an amount of 0.02 to 2.8% by mass, preferably 0.02 to 1.8% by mass, more preferably 0.02 to 0.25% by mass.

Cu and Mg are elements which can improve strength through precipitation strengthening. In order to preferably obtain the effect, Cu is contained in the aluminum-alloy in an amount of 0.05 to 0.63% by mass, preferably 0.2 to 0.5% by mass. Moreover, practically, the amount may be 0.06 to 0.49% by mass. Mg is contained in the aluminum-alloy in an amount of 0.03 to 0.45% by mass, preferably 0.04 to 0.45% by mass, more preferably 0.15 to 0.3% by mass. Moreover, practically, the amount may be 0.03 to 0.36% by mass. In the case where Cu and Mg are both contained, the total amount of both metals in the aluminum-alloy is preferably 0.04 to 0.6% by mass, more preferably 0.1 to 0.4% by mass.

The contained amounts of the respective elements include respective amounts of Si, Fe, Cu, and Mg, and not necessarily mean the amounts added.

Since the respective elements lower electric conductivity of the aluminum-alloy when they are contained in large amounts exceeding the above ranges, the cases are not preferred. Specifically, in order to achieve the electric conductivity of 58% IACS necessary as electric wire for automobiles, Zr, Si, Cu, and Mg are contained in the ranges of 0.08% by mass or less, 2.8% by mass or less, 0.63% by mass or less, and 0.45% by mass or less, respectively.

As unavoidable impurities which are possibly contained in the aluminum-alloy, zinc (Zn), nickel (Ni), manganese (Mn), rubidium (Pb), chromium (Cr), titanium (Ti), tin (Sn), vanadium (V), gallium (Ga), boron (B), sodium (Na), and the like may be mentioned. They are unavoidably contained in the range where the effect of the invention is not inhibited and the properties of the aluminum-alloy of the invention are not particularly influenced, and elements previously contained in the pure aluminum base metal to be used are also included in the unavoidable impurities referred to here.

The amount of the unavoidable impurities is preferably 0.07% or less, more preferably 0.05% or less in total in the alloy.

The aluminum-alloy can be cast according to usual production methods after prescribed elements are added to the aluminum base metal.

The electric wire or cable according to the invention includes a strand formed of the above aluminum-alloy for conductive wire. Here, to include the aluminum-alloy strand means to contain a strand that is a solid wire (i.e., a solid conductor) as a twisted wire (i.e., a twisted wire conductor) formed by twisting a plural pieces of strands (3 to 1500 pieces, e.g., 11 pieces) together and generally, the strand is contained in the form of a twisted wire (also referred to as a core wire).

The electric wire is a covered wire where the twisted wire that is a bare wire is covered with any insulating resin layer, and one obtained by bundling a plural pieces of electric wires to form single sheathed one is a cable or a wire harness.

Namely, the electric wire or cable according to the invention is sufficiently one containing a conductor (i.e., a twisted wire) including a strand formed of the above aluminum-alloy and a covering layer provided on the outer circumference of the conductor. The other specific constitution and shape and the production method are not particularly limited.

The shape and the like of the aluminum-alloy strand constituting the conductor is also not particularly limited but, in the case where the strand is, for example, a round wire and is used for the electric wire for automobiles, the diameter (i.e., final wire diameter) is preferably about 0.07 to 1.5 mm, more preferably about 0.14 to 0.5 mm.

With regard to the kind of the resin for use in the covered layer, known insulating resins such as olefin resins, e.g., crosslinked polyethylene, polypropylene, and the like and vinyl chloride can be arbitrarily used, and the covering thickness is appropriately determined.

The electric wire or cable can be used in various uses such as electric or electronic components, mechanical components, vehicle components, and building materials. Of these, the electric wire or cable can be preferably used as an electric wire or cable for vehicles.

The aluminum-alloy strand that constitutes a conductor of the electric wire or cable is produced by producing a wire rod according to a usual production method and wire-drawing it. At the wire-drawing, a thermal treatment (annealing) may be appropriately performed but the strand is preferably an aluminum-alloy strand wire-drawn until becoming the final wire diameter before the thermal treatment. Work hardening is suppressed by performing wire-drawing without the thermal treatment performed before the wire-drawing and in mid-stream of the wire-drawing, and also the properties such as the electric conductivity and the elongation can be improved by performing annealing after the wire-drawing.

Therefore, as a preferred production method of the aluminum-alloy strand, the production method according to the invention including the following steps may be mentioned. Namely, the steps are (1) a step of forming a wire rod using the above aluminum-alloy for conductive wire (rolling step), (2) a step of wire-drawing the obtained wire rod until becoming a final wire diameter (reduction work step), and (3) a step of continuously annealing or batch-wise annealing the wire rod which has been wire-drawn. Here, the step (2) of the wire-drawing means a reduction work and does not include a step of the thermal treatment. Therefore, the wire-drawing in the step (2) is performed without the thermal treatment.

Thus, according to the production method according to the invention, when the method is described involving the casting step of the alloy, the strand can be produced in the flow of steps of casting, rolling, wire-drawing, and thermal treatment. Therefore, the invention relates to a remarkably effective production method in view of both time and cost as compared with the steps of casting, rolling, wire-drawing, thermal treatment, wire-drawing, and thermal treatment.

The respective steps can be performed by known methods and, in addition to the above (1) to (3), the other steps for strand production, e.g., a facing step may be included.

The above process into the wire rod in the above (1) can be performed by a continuous casting and rolling method, an extrusion method, and the like. Rolling may be either hot rolling or cold rolling.

The wire-drawing in the above (2) is performed using a dry or wet wire-drawing machine and conditions thereof are not particularly limited.

Since the above aluminum-alloy for conductive wire is excellent in wire-drawing property, for example, a wire rod having a diameter of 9.5 mm can be drawn until becoming a final diameter of about 0.3 mm without the thermal treatment.

Of the annealing step in the above (3), the continuous annealing can be performed using a continuous annealing furnace and, for example, an aluminum wire can be transferred at a prescribed speed to be passed through a heating furnace and be heated at a prescribed zone to perform the annealing. As a heating means, for example, a high-frequency heating furnace and the like may be mentioned. Also, batchwise annealing can be suitably utilized. The transferring speed, annealing time, annealing temperature, and the like are not particularly limited and cooling conditions after annealing are also not particularly limited.

As mentioned above, in the invention, it is possible to perform wire-drawing before the thermal treatment and subsequent annealing by using the aluminum-alloy having the above composition. The electric conductivity and the elongation property of the strand can be improved by performing the thermal treatment after the wire-drawing but, on the other hand, the treatment results in lowering the strength (tensile strength) since the alloy hardened by the wire-drawing is to be softened. However, the above aluminum-alloy has a composition which can satisfy various required properties including strength even when the strength is lowered and thus an aluminum-alloy strand having lightness in weight that is a characteristic feature of aluminum, maintaining a good electric conductivity, and having a good elongation ratio and a sufficient tensile strength can be obtained.

With regard to the properties of the aluminum-alloy strand, it is preferred that the tensile strength is 80 MPa or more, the electric conductivity is 58% IACS or more, and the elongation ratio is 10% or more. The tensile strength is preferably 80 to 150 MPa, more preferably 110 to 130 MPa. The elongation ratio is preferably 10 to 30%, more preferably 15 to 20%. The electric conductivity is 64% IACS or less of pure aluminum. Furthermore, with regard to the wire-drawing property, wire breaking preferably occurs 5 times or less/ton as a rough standard at the production of the strand from 1 ton of the wire rod.

EXAMPLES

The following will explain the present invention in detail with reference to Examples, but the invention is not limited thereto.

Examples and Comparative Examples

Using a first-class aluminum base metal of JIS H 2102, prescribed amounts of Fe, Zr, Si, and Cu or Mg were added thereto to obtain each aluminum-alloy having a component composition shown in Table 1. This is melted by a usual method and processed into a wire rod having a diameter of 9.5 mm by a continuous casting and rolling method.

Then, the wire rod was wire-drawn using a continuous wire-drawing machine to obtain a wire material (thin wire) having a diameter of 0.32 mm. The wire material was subjected to continuous annealing to produce an aluminum-alloy strand.

For the obtained aluminum-alloy strand having a wire diameter of 0.32 mm, the following properties were evaluated in accordance with JIS C 3002. As for the electric conductivity, resistivity thereof was measured in a constant-temperature bath kept at 20° C. (±0.5° C.) using a four-terminal method and the electric conductivity was calculated. The distance between the terminals was 1000 mm. The tensile strength and elongation ratio were measured at a tensile rate of 50 mm/minutes.

Furthermore, as evaluation of the wire-drawing property, the number of times of wire breaking was counted at the production of the strand from 1 ton of the wire rod and the wire-breaking property was evaluated as follows: the case of 5 times/ton or less is marked "good" and the case of 6 to 9 times/ton is marked "moderate", and the case of 10 times or more/ton is marked "bad".

The obtained results are shown in Table 1.

TABLE 1

| | NO. | Zr | Fe | Si [wt %] | Cu | Mg | Electric conductivity % IACS | Tensile strength MPa | Elongation ratio % | Wire-breaking property |
|---|---|---|---|---|---|---|---|---|---|---|
| Example | 1 | 0.02 | 0.1 | 0.02 | 0.06 | — | 60.6 | 81 | 28 | good |
| | 2 | 0.02 | 0.1 | 0.02 | — | 0.03 | 60.8 | 80 | 29 | good |
| | 3 | 0.08 | 0.1 | 0.02 | 0.06 | — | 58.2 | 82 | 24 | good |
| | 4 | 0.08 | 0.1 | 0.02 | — | 0.03 | 58.3 | 80 | 29 | good |
| | 5 | 0.02 | 0.9 | 0.02 | 0.06 | — | 59.4 | 121 | 17 | good |
| | 6 | 0.02 | 0.9 | 0.02 | — | 0.03 | 59.6 | 120 | 17 | good |
| | 7 | 0.02 | 0.1 | 2.3 | 0.06 | — | 58.5 | 195 | 11 | good |
| | 8 | 0.02 | 0.1 | 2.3 | — | 0.03 | 58.6 | 194 | 11 | good |
| | 9 | 0.02 | 0.1 | 0.02 | 0.45 | — | 58.3 | 112 | 15 | good |
| | 10 | 0.02 | 0.1 | 0.02 | — | 0.35 | 58.0 | 115 | 17 | good |
| | 11 | 0.05 | 0.6 | 0.02 | 0.12 | — | 58.3 | 111 | 18 | good |
| | 12 | 0.05 | 0.6 | 0.02 | — | 0.05 | 58.6 | 107 | 21 | good |
| | 13 | 0.03 | 0.8 | 0.02 | 0.2 | — | 58.3 | 127 | 16 | good |
| | 14 | 0.03 | 0.8 | 0.02 | — | 0.1 | 58.7 | 122 | 17 | good |
| | 15 | 0.02 | 0.1 | 0.02 | 0.05 | 0.04 | 60.4 | 85 | 23 | good |
| | 16 | 0.02 | 0.1 | 0.02 | 0.2 | 0.2 | 58.1 | 114 | 23 | good |
| | 17 | 0.08 | 0.1 | 0.02 | 0.05 | 0.03 | 58.0 | 84 | 23 | good |
| | 18 | 0.02 | 0.9 | 0.02 | 0.08 | 0.08 | 58.6 | 131 | 16 | good |
| | 19 | — | 0.1 | 0.02 | 0.05 | — | 61.5 | 80 | 24 | good |
| | 20 | — | 0.1 | 0.02 | 0.63 | — | 58.0 | 126 | 23 | good |
| | 21 | — | 0.1 | 0.02 | — | 0.04 | 61.5 | 80 | 18 | good |
| | 22 | — | 0.1 | 0.02 | — | 0.45 | 58.0 | 126 | 23 | good |
| | 23 | — | 0.1 | 0.02 | 0.55 | 0.05 | 58.1 | 126 | 20 | good |
| | 24 | — | 0.1 | 0.02 | 0.02 | 0.02 | 61.5 | 80 | 18 | good |
| Comparative Example | 1 | 0.1 | 0.1 | 0.02 | 0.06 | — | 57.4 | 82 | 24 | good |
| | 2 | 0.1 | 0.1 | 0.02 | — | 0.03 | 57.5 | 80 | 29 | good |
| | 3 | 0.05 | 1.1 | 0.02 | 0.12 | — | 57.5 | 136 | 13 | moderate |
| | 4 | 0.05 | 1.2 | 0.02 | — | 0.05 | 57.7 | 137 | 11 | moderate |
| | 5 | 0.02 | 0.1 | 3 | 0.06 | — | 57.8 | 230 | 8 | bad |
| | 6 | 0.02 | 0.1 | 3 | — | 0.03 | 57.9 | 229 | 9 | bad |
| | 7 | 0.02 | 0.1 | 0.02 | 0.6 | — | 57.4 | 124 | 17 | good |
| | 8 | 0.02 | 0.1 | 0.02 | — | 0.4 | 57.6 | 121 | 16 | good |

The aluminum-alloy strands of Examples were excellent in all of electric conductivity, tensile strength, elongation property, and wire-drawing property. Thus, it is confirmed that they can be preferably used as electric wires or cables for automobiles.

On the other hand, the aluminum-alloy strands of Comparative Examples could not achieve desired electric conductivity. Moreover, it was found that the elongation property was low as compared with Examples. Furthermore, since the aluminum-alloy strands of Comparative Examples were poor in wire-drawing property, wire breaking occurred 10 times/ton or more during the production process.

The present application is based on Japanese Patent Application No. 2009-159549 filed on Jul. 6, 2009, the contents of which are incorporated herein by reference.

INDUSTRIAL APPLICABILITY

Since the electric wire or cable of the invention contains an aluminum-alloy strand excellent in electric conductivity, tensile strength, and elongation property although the strand is light in weight, it can be suitably utilized particularly for wire harness for automobiles.

The invention claimed is:

1. A method for producing an aluminum-alloy strand from an aluminum-alloy comprising:

Fe: [0.1% by mass or more to less than 1.0% by mass] *0.4 to 0.8% by mass*;

Zr: [0] *0.02* to 0.08% by mass;

Si: 0.02 to 2.8% by mass;

at least one of Cu: 0.05 to 0.63% by mass and Mg: 0.04 to 0.45% by mass; and the remainder being aluminum and unavoidable impurities, the method comprising the steps of:

(1) forming a wire rod using the aluminum-alloy;

(2) wire-drawing the wire rod, without a thermal treatment *before the wire-drawing or in midstream of the wire-drawing,* until becoming a desired final wire diameter; and (3) continuously annealing or batch-wise annealing the *wire-drawn* wire rod [which has been wire-drawn] *to produce the aluminum-alloy strand.*

*2. The method of claim 1, wherein the desired final wire diameter is 0.07 mm to 1.5 mm.*

*3. The method of claim 1, wherein the desired final wire diameter is 0.14 mm to 0.5 mm.*

*4. The method of claim 1, wherein the unavoidable impurities are 0.07% or less by mass.*

*5. The method of claim 1, wherein the unavoidable impurities are 0.05% or less by mass.*

*6. The method of claim 1, wherein the wire-drawing is performed using a dry wire-drawing machine.*

*7. The method of claim 1, wherein the wire-drawing is performed using a wet wire-drawing machine.*

*8. The method of claim 1, wherein the forming is performed by a continuous casting and rolling method.*

*9. The method of claim 8, wherein the rolling of the continuous casting and rolling method is hot rolling.*

*10. The method of claim 8, wherein the rolling of the continuous casting and rolling method is cold rolling.*

*11. The method of claim 1, wherein the forming is performed by an extrusion method.*

* * * * *